Feb. 7, 1950 P. E. MILTON 2,496,885
PLANTER
Filed Feb. 19, 1946 2 Sheets-Sheet 1
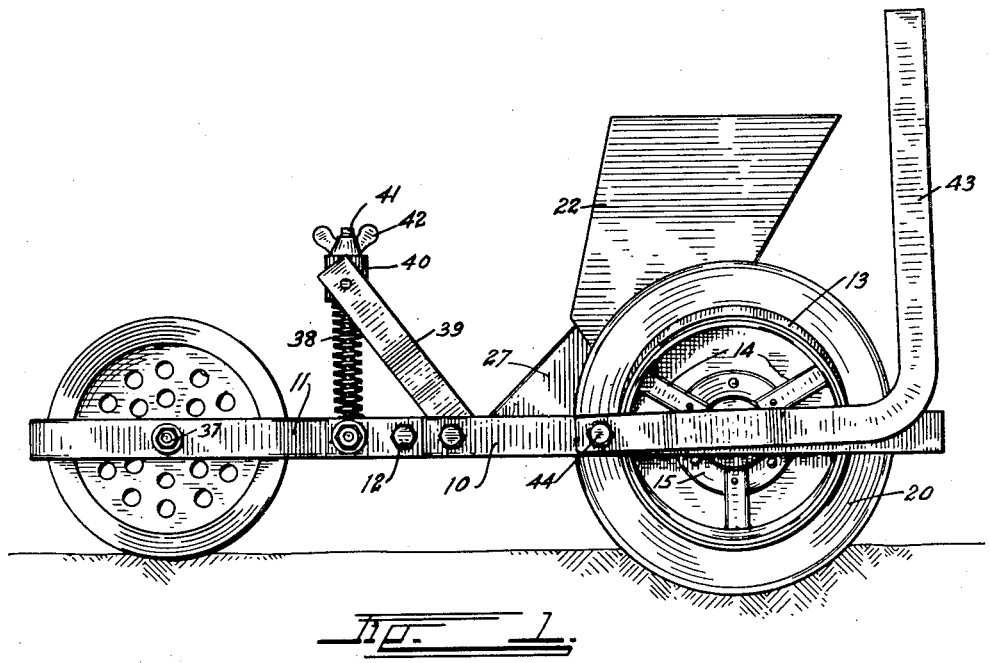
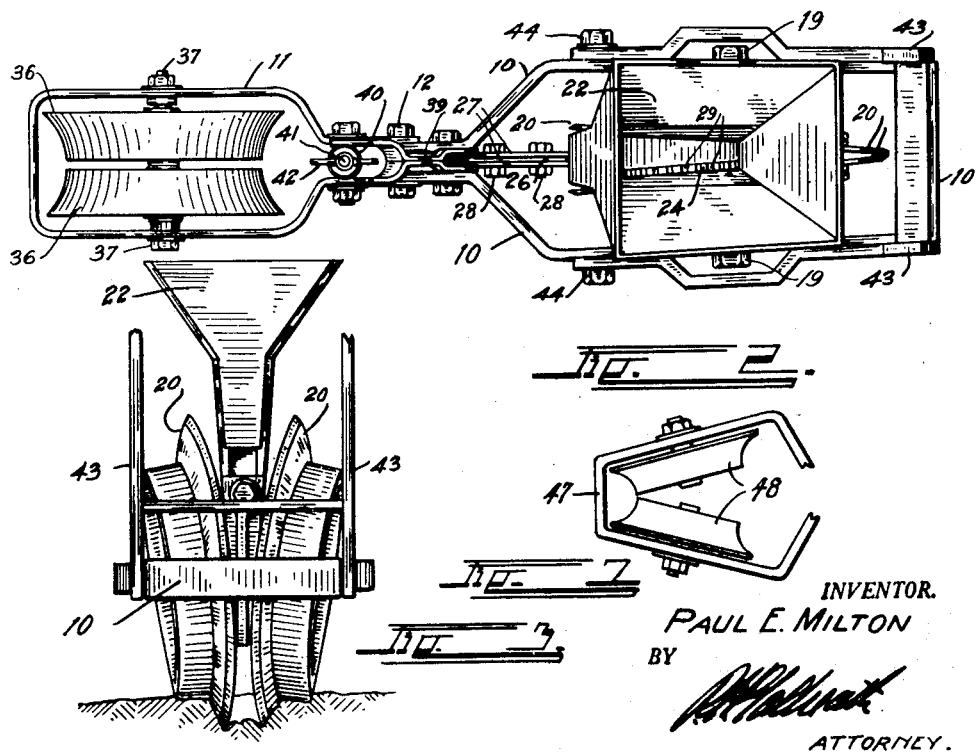
INVENTOR.
PAUL E. MILTON
BY
ATTORNEY.

Feb. 7, 1950 P. E. MILTON 2,496,885
PLANTER
Filed Feb. 19, 1946 2 Sheets-Sheet 2
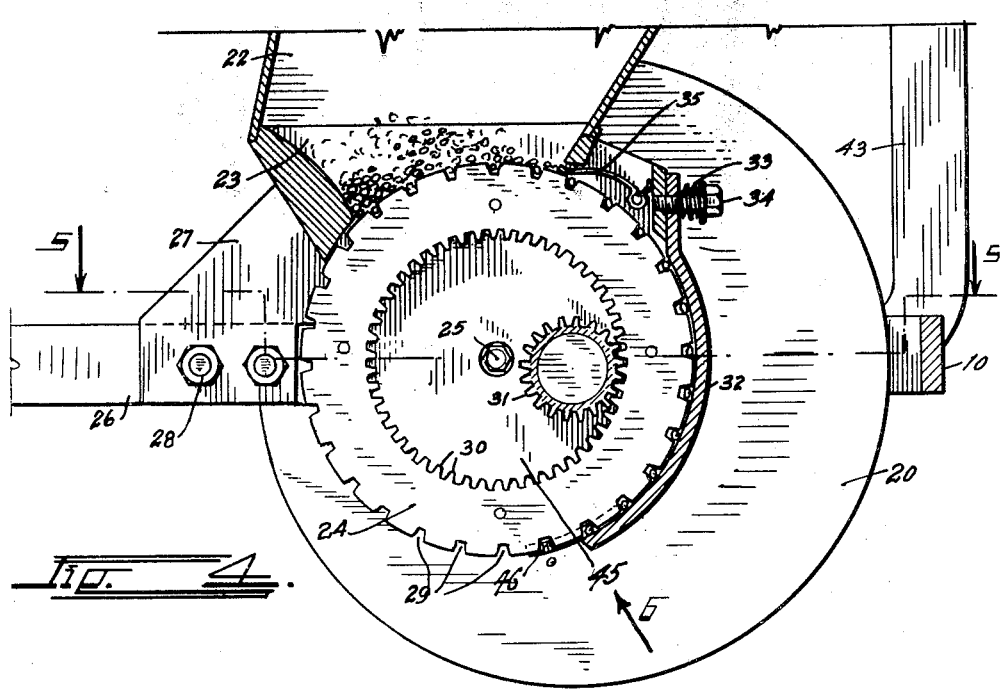
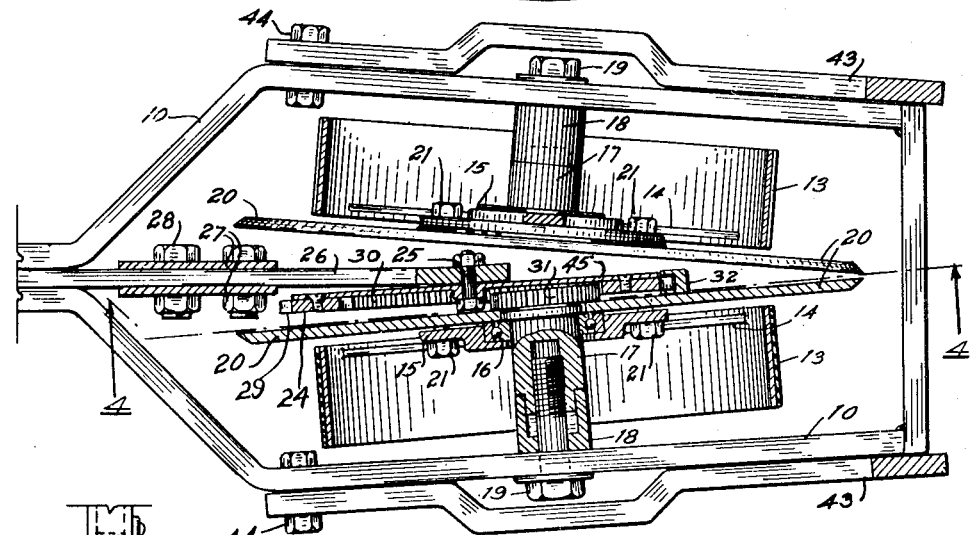
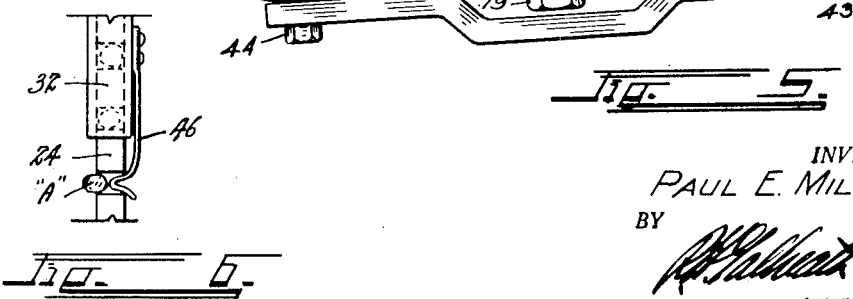
INVENTOR.
PAUL E. MILTON
BY
ATTORNEY.

Patented Feb. 7, 1950

2,496,885

UNITED STATES PATENT OFFICE 2,496,885

PLANTER

Paul E. Milton, Johnstown, Colo.

Application February 19, 1946, Serial No. 648,750

3 Claims. (Cl. 111—77)

This invention relates to a planter, more particularly designed for planting sugar beet seed. It is not, however, limited to this particular use but may be used whenever it is desired to plant seed crops.

The principal object of this invention is to provide simple, highly efficient, compact seeding units which may be attached along the cultivator bar of a typical farm cultivator to seed any desired number of rows simultaneously.

Another object of the invention is to so construct the device that it will accurately feed and uniformly plant irregular seeds of the sugar beet type.

A further object is to so construct the device that the depth of planting, the pressure of packing, etc., can be accurately regulated.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawings and throughout the description.

In the drawing:

Fig. 1 is a side elevation of the improved planter;

Fig. 2 is a plan view thereof;

Fig. 3 is a front view thereof;

Fig. 4 is an enlarged, longitudinal section through the planting mechanism, taken on the line 4—4, Fig. 5;

Fig. 5 is an enlarged, horizontal section through the planting mechanism, taken on the line 5—5, Fig. 4;

Fig. 6 is a fragmentary detail view looking in the direction of the arrow 6 in Fig. 4; and Fig. 7 is a detail plan view illustrating an alternate arrangement of press wheels for the improved planter.

The improved planters are designed for attachment along the cultivator bar of a typical farm cultivator to plant a plurality of said rows simultaneously. The method of attachment to the cultivator bar and the selection of the number of planters desired is within the skill of any user. A single planter is illustrated on the accompanying drawings and described in the following description.

Each planter comprises a frame 10, the forward extremity of which is narrowed in width. The rear extremity of the frame 10 is hinged to a wheel yoke 11 upon a suitable hinge bolt 12.

The frame 10 is supported on a pair of ground engaging wheels 13 supported from spokes 14 extending from wheel discs 15. The wheel discs 15 are mounted on anti-friction bearings 16.

The bearings 16 in turn are mounted on stub axles 17. The stub axles 17 set into socket members 18 which rest against the sides 10. Clamp screws 19 are threaded into the stub axles 17 to clamp the entire wheel assemblies to the sides of the frame 10. A furrow disc 20 is secured to each wheel disc 15 by means of suitable cap screws 21.

The sides of the frame 10 are inclined inwardly toward the front so as to position the forward edges of the two discs 20 relatively close together and to separate the rearward edges thereof. This allows sufficient space between the two discs 20 for a seed hopper 22.

The bottom of the seed hopper terminates in an elongated seed spout 23 which sets snugly against the periphery of a notched seed ring 24. The seed ring 24 is mounted about the periphery of a circular wheel plate 45 which is rotatably mounted on an axle bolt 25. The axle bolt 25 is supported by a bracket member 26 extending forwardly from the rearward portion of the frame 10.

The bracket member 26 also acts to support the seed hopper 22 upon two supporting plates 27 which are bolted to the bracket member 26 by means of bracket bolts 28.

The outer periphery of the seed ring 24 is provided with a plurality of seed receiving notches 29 and the inner periphery thereof is provided with internal gear teeth 30 which mesh with a toothed drive pinion 31 which is concentrically welded to one of the discs 20 so as to rotate therewith.

Thus it can be seen that as the wheels 13 rotate forwardly at their tops, they will cause the seed ring 24 to similarly rotate forwardly at a reduced speed. The rotation of the seed ring 24 causes seeds to enter the notches 29 from the spout 23 and be carried forwardly and downwardly until the bottom point is reached, at which time, the seeds will fall to the ground into the furrow formed by the angularly positioned furrow discs 20.

An arcuate grooved retaining shoe 32 is constantly urged against the downwardly traveling side of the seed wheel 24 by means of a compression spring 33. The spring 33 is mounted on a spring bolt 34 which also serves to support the retaining shoe 32. The bolt 34 is threaded into an extension on the seed spout 23.

A scraper spring 35, of the leaf spring type, extends slightly into the seed spout 23 at the point where the seeds exit therefrom through the notches 29. The passage of the notches beneath the spring 35 constantly vibrates the latter to separate and force the seeds individually into the notches.

The rear portion of the planter is supported on a pair of press wheels 36 mounted on an axle bolt 37 in the wheel yoke 11. The wheels 36 have a curvated conical shape which rolls the earth inwardly from the two sides of the filled seed furrow so as to cover the seeds therein.

The pressure on the press wheels 36 is exerted through a compression spring 38 extending between the wheel yoke 11 and a spring bracket 39 secured to the frame 10. The spring bracket 39 hingedly supports a collar member 40 against which the spring 38 acts. A tension bolt 41 extends from the wheel bracket 11 through the collar 40. This bolt is provided with a wing nut 42 by means of which the wheel yoke may be raised or lowered about the axis of the hinge bolt 12.

The planter is connected to the cultivator bar of a conventional cultivator by means of a pair of L-shaped attachment arms 43. The arms 43 extend forwardly and upwardly from pivot bolts 44 threaded into each side of the frame 10.

The upstanding positions of the arms 43 are adapted to receive the usual cultivator foot clamps of the cultivator.

A snap spring 46 is secured to the side of the lower extremity of the retaining shoe 32 and projects therefrom into resilient contact with the side of the notched edge of the seed ring 24. The extremity of the spring 46 is bent to partially enter each successive notch 29 to snap the seed, indicated at A, therefrom should it fail to fall by gravity.

In Fig. 7, an alternate arrangement of press wheels is illustrated in this form. The rearward extremity of the wheel bracket is narrowed as indicated at 47 and two press wheels 48, similar to the press wheels 36, are mounted on the inwardly inclined sides thereof. This causes the wheels 48 to be separated at their forward edges and to lie close together at their rearward edges. This causes the wheels to sweep the earth inward over the seeds and to press a ridge of earth thereover.

It will be noted in Figs. 2 and 5 that the seed wheel 24 lies almost parallel to the outwardly inclined disc 20. This is necessary in order to obtain proper intermeshing between the pinion 31 and the ring gear teeth 30. This has another advantage, however, in that it causes the seed wheel to travel through the hopper at an angle to the two parallel sides thereof, and it also places the seed against the right side wall and not down the middle of the hopper, as in the conventional planter. The seeds are guided directly into the notches of the seed wheel by the adjacent side wall, and the side position prevents bridging or arching over the wheel which occurs with the conventional center placement, and has resulted in 100% fill at ground speeds of 7.65 miles per hour.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a seed planter of the type having two vertically positioned furrow discs inclined toward each other at their forward edges, means for dropping seeds between said discs comprising: a support extending between said discs; a circular wheel plate mounted on said support so as to rotate in a plane substantially parallel to one of said discs overlapping the axis thereof; a ring gear concentrically secured to said plate, said ring gear having seed-receiving notches in its periphery; and a drive pinion axially secured to and projecting from said latter disc into mesh with said ring gear.

2. In a seed planter of the type having two vertically positioned furrow discs inclined toward each other at their forward edges, means for dropping seeds between said discs comprising: a support extending between said discs; a circular wheel plate mounted on said support so as to rotate in a plane substantially parallel to one of said discs overlapping the axis thereof; a ring gear concentrically secured to said plate, said ring gear having seed-receiving notches in its periphery; a drive pinion axially secured to and projecting from said latter disc into mesh with said ring gear; and means for rotatably supporting said furrow discs from the outside faces only to allow space for said wheel plate and ring gear.

3. A seed planter comprising: a horizontally extending frame; a pair of vertically positioned ground engaging discs rotatably mounted in said frame, the planes of said discs approaching each other towards the forward extremity of the said frame; a seed hopper supported between said discs; a vertically positioned rotatably mounted seed wheel journalled between said discs and extending into the bottom of said seed hopper, there being spaced-apart seed-receiving notches in the periphery of said seed wheel; a guard plate extending partially around the periphery of said seed wheel on the descending side thereof to retain seeds in said notches; a toothed pinion mounted to rotate with one of said discs; and an internal ring gear formed on said seed wheel meshing with said pinion to cause said seed wheel to rotate with said ground engaging discs.

PAUL E. MILTON.

REFERENCES CITED

The following references are of record in the file of this patent:

UNITED STATES PATENTS

| Number | Name | Date |
|---|---|---|
| 9,439 | Colver | Dec. 7, 1852 |
| 273,647 | Ward | Mar. 6, 1883 |
| 434,749 | Anderson | Aug. 19, 1890 |
| 530,962 | Packham | Dec. 18, 1894 |
| 705,598 | McCain | July 29, 1902 |
| 1,080,038 | Youngberg | Dec. 2, 1913 |
| 1,150,537 | Roby | Aug. 17, 1915 |
| 1,226,800 | Olson | May 22, 1917 |
| 1,519,928 | Priesnitz | Dec. 16, 1924 |
| 2,106,901 | Rassmann | Feb. 1, 1938 |

FOREIGN PATENTS

| Number | Country | Date |
|---|---|---|
| 9,799 | Sweden | May 20, 1899 |
| 26,798 | Sweden | May 8, 1909 |
| 34,640 | France (Addition to 644,622) | Mar. 12, 1929 |
| 403,144 | Germany | Sept. 23, 1924 |
| 482,174 | France | Dec. 2, 1916 |
| 718,081 | France | Oct. 27, 1931 |